(12) United States Patent
Tseng

(10) Patent No.: US 7,374,191 B1
(45) Date of Patent: May 20, 2008

(54) BICYCLE FRAME

(75) Inventor: Ting-Huang Tseng, Changhua Hsien (TW)

(73) Assignee: Merida Industry Co., Ltd., Changhua Hsien (TW)

( * ) Notice: Subject to any disclaimer, the term of this patent is extended or adjusted under 35 U.S.C. 154(b) by 0 days.

(21) Appl. No.: 11/724,084

(22) Filed: Mar. 14, 2007

(51) Int. Cl.
*B62D 3/02* (2006.01)
(52) U.S. Cl. ..................................... 280/284
(58) Field of Classification Search ............... 280/284, 280/283, 288, 285
See application file for complete search history.

(56) References Cited

U.S. PATENT DOCUMENTS

| | | | | |
|---|---|---|---|---|
| 2,283,671 A * | 5/1942 | Finlay | ........................ | 280/284 |
| 4,421,337 A * | 12/1983 | Pratt | ........................ | 280/277 |
| 5,217,241 A * | 6/1993 | Girvin | ........................ | 280/284 |
| 5,496,052 A * | 3/1996 | Tamaishi | ..................... | 280/284 |
| 5,570,896 A * | 11/1996 | Collins | ........................ | 280/284 |
| 6,056,307 A * | 5/2000 | Busby et al. | ............... | 280/284 |
| 6,099,010 A * | 8/2000 | Busby | ........................ | 280/284 |
| 6,406,048 B1 * | 6/2002 | Castellano | ................... | 280/284 |
| 7,168,726 B2 * | 1/2007 | Klein | ........................ | 280/284 |

* cited by examiner

*Primary Examiner*—Tony Winner
(74) *Attorney, Agent, or Firm*—Alan Kamrath; Kamrath & Assocaites PA

(57) ABSTRACT

A bicycle frame has a front frame, a rear frame and a shock absorber. The front frame has a head tube, a down tube, a top tube, a bottom bracket shell and a seat tube. The seat tube is connected to and protrudes up from the bottom bracket shell, is connected to the top tube and has a jacket and a threaded hole. The jacket is connected to the shock absorber and has an opening and a chamber. The rear frame is connected pivotally to the front frame and has a lower fork, two dropouts and an upper fork. The upper fork is connected to the dropouts and the shock absorber and has two bottom ends, a top end and two fasteners. The shock absorber is mounted between the seat tube and the upper fork and has a sleeve, an elastomer, a connecting pipe and a shaft.

6 Claims, 6 Drawing Sheets

BICYCLE FRAME

BACKGROUND OF THE INVENTION

1. Field of the Invention

The present invention relates to a frame, and more particularly to a frame for a bicycle and that can reduce the weight of the bicycle and has a shock absorber to provide a smooth operation.

2. Description of Related Art

With reference to FIG. 6, a conventional bicycle frame (50) with a shock absorbing capability has a front frame (52), a rear frame (55) and a shock absorber (51). The front frame (52) has a mounting bracket (53) and a driving bracket (54). The mounting bracket (53) is attached securely to the front frame (52). The driving bracket (54) is attached pivotally to the front frame (52) and has a lower end, a middle and an upper end. The lower end of the driving bracket (54) is attached pivotally to the front frame (52). The rear frame (55) is connected pivotally to the middle and the upper end of the driving bracket (54) and move ups and pivots the driving bracket (54) when a shock is transmitted to the rear frame (55). The shock absorber (51) is mounted pivotally between the mounting bracket (53) and the upper end of the driving bracket (54) and absorbs the shock transmitted to the driving bracket (54) from the rear frame (55).

However, the conventional bicycle frame (50) has the following shortcomings.

1. The conventional bicycle frame (50) can provide a shock absorbing capability, but the weight of the mounting bracket (53), the driving bracket (54) and the shock absorber (51) and the cost of manufacturing the conventional bicycle frame (50) will increase.

2. The shock absorber (51) is mounted exposed between the mounting bracket (53) and the driving bracket (54) of the conventional bicycle frame (50), and this may cause the shock absorber (51) weaken and influence the appearance of the conventional bicycle frame (50).

To overcome the shortcomings, the present invention provides a bicycle frame to mitigate or obviate the aforementioned problems.

SUMMARY OF THE INVENTION

The main objective of the present invention is to provide a bicycle frame that the weight of the bicycle frame is reduced and has a shock absorber to provide a smooth operation.

The bicycle frame in accordance with the present invention has a front frame, a rear frame and a shock absorber. The front frame has a head tube, a down tube, a top tube, a bottom bracket shell and a seat tube. The seat tube is connected to and protrudes up from the bottom bracket shell, is connected to the top tube and has a jacket and a threaded hole. The jacket is connected to the shock absorber and has an opening and a chamber. The rear frame is connected to the front frame and has a lower fork, two dropouts and an upper fork. The upper fork is connected to the dropouts and the shock absorber and has two bottom ends, a top end and two fasteners. The shock absorber is mounted between the seat tube and the upper fork and has a sleeve, an elastomer, a connecting pipe and a shaft.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
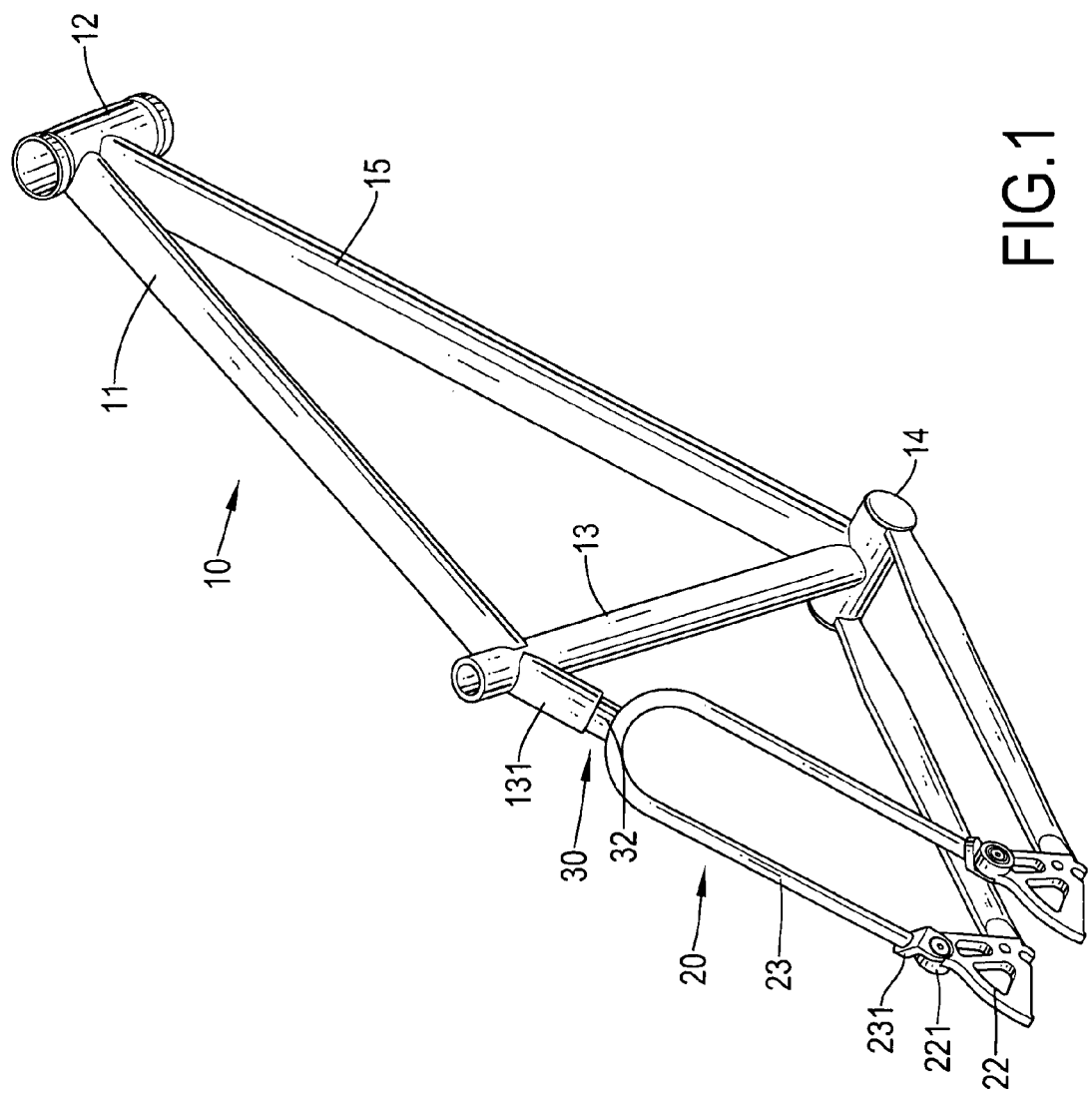
FIG. 1 is a perspective view of a bicycle frame in accordance with the present invention.
Figure 2:
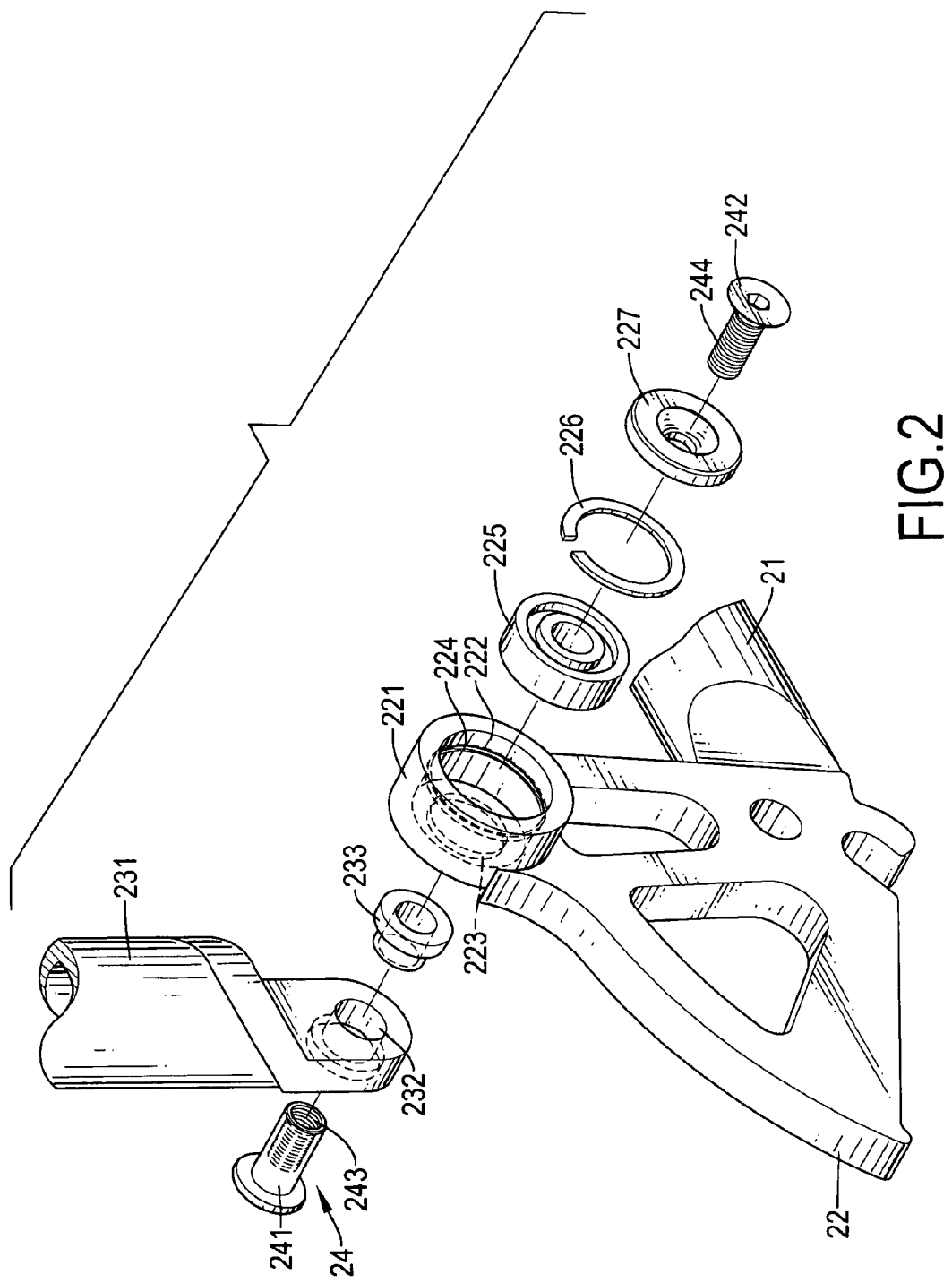
FIG. 2 is an enlarged exploded perspective view of an upper fork and a dropout on the bicycle frame in FIG. 1.
Figure 4:
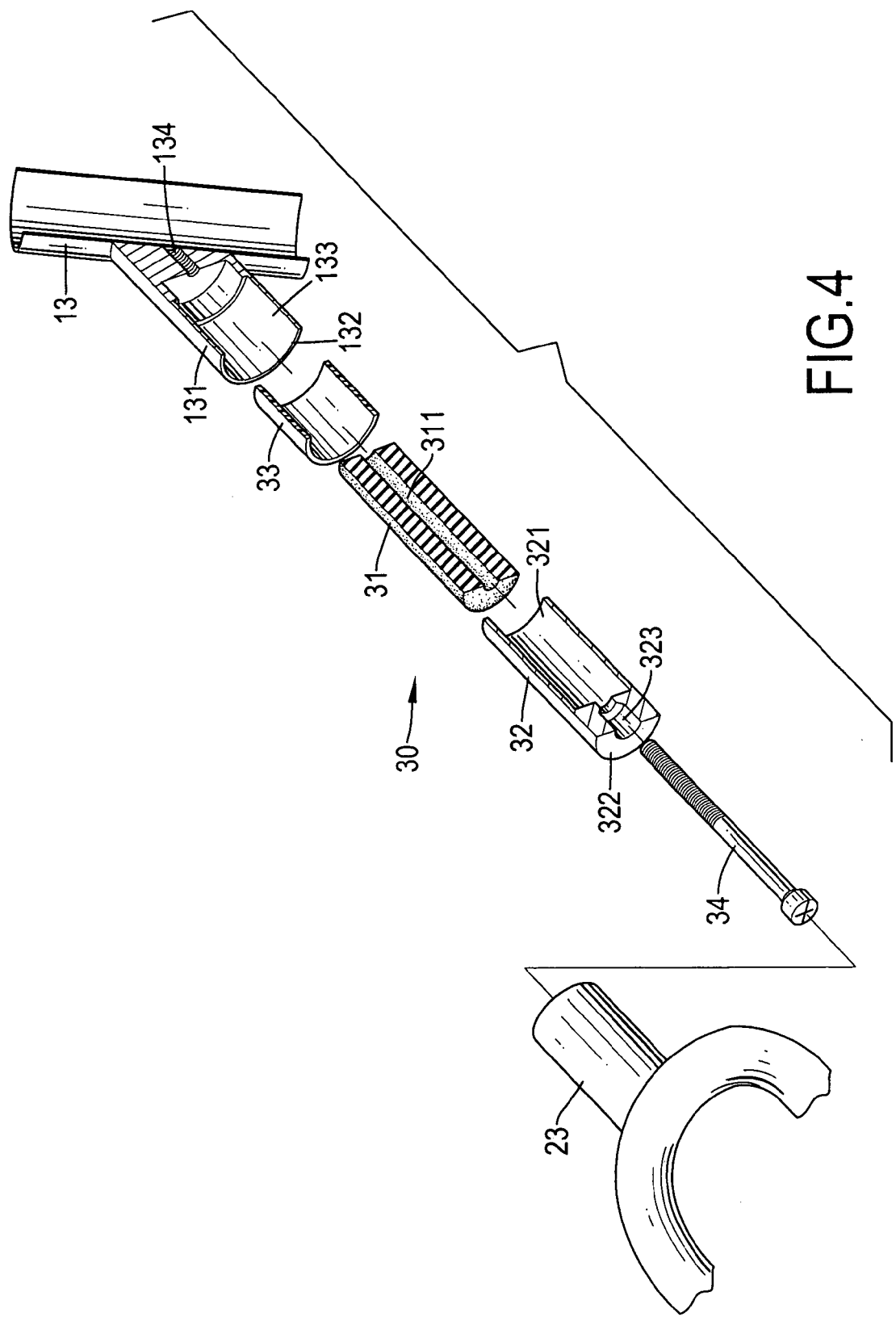
FIG. 4 is an enlarged exploded perspective view in partial section of an upper fork and a shock absorber in FIG. 1.

With reference to FIGS. 1, 2 and 4, a bicycle frame in accordance with the present invention comprises a front frame (10), a rear frame (20) and a shock absorber (30).

The front frame (10) has a front, a rear, a head tube (12), a down tube (15), a top tube (11), a bottom bracket shell (14) and a seat tube (13).

The head tube (12) is formed at the front of the front frame (10).

The down tube (15) is connected to and protrudes at an angle down from the head tube (12) toward the rear end of the front frame (10) and has a bottom end.

The top tube (11) is substantially horizontal, is connected to and protrudes substantially horizontally from the head tube (12) toward the rear end of the front frame (10) and has a rear end.

The bottom bracket shell (14) is connected transversally to the bottom end of the down tube (15) and has a top.

The seat tube (13) is connected to and protrudes up from the top of the bottom bracket shell (14), is connected to the rear end of the top tube (11) and has an external surface, an upper end, a lower end, a jacket (131) and a threaded hole (134). The jacket (131) is formed on and protrudes down from the external surface of the seat tube (13) near the upper end opposite to the top tube (11), is connected to the shock absorber (30) and has a mounting end, a connecting end, an opening (132) and a chamber (133). The mounting end of the jacket (131) is formed on the external surface of the seat tube (13). The opening (132) is defined in the connecting end of the seat tube (13) opposite to the mounting end. The chamber (133) is defined in the jacket (131) and is communicated with the opening (132). The threaded hole (134) is formed axially through the mounting end of the jacket (131) and is communicated with the chamber (133) and the seat tube (13).

Figure 3:
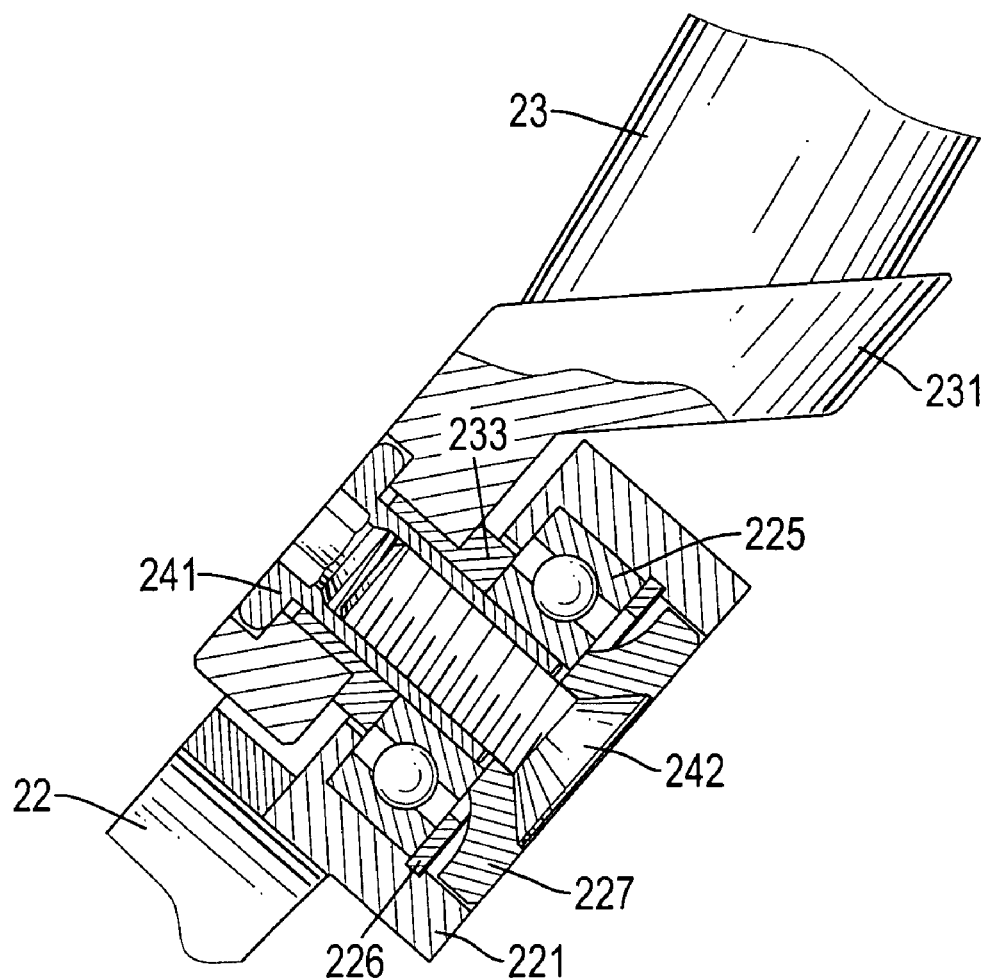
FIG. 3 is a side view in partial section of the bicycle frame in FIG. 2.

With reference to FIGS. 2 and 3, the rear frame (20) is connected pivotally to the front frame (10) and has a lower fork (21), two dropouts (22) and an upper fork (23).

The lower fork (21) is connected pivotally to the bottom bracket shell (14) below the seat tube (13) and has a front end and two rear ends. The front end of the lower fork (21) is connected to the bottom bracket shell (14). The rear ends of the lower fork (21) are formed with the front end and parallel to each other.

The dropouts (22) are respectively mounted to the rear ends of the lower fork (21), and each dropout (22) has a top, a mounting sheath (221), a bearing (225), a C-ring (226) and a cover (227). The mounting sheath (221) is hollow, is mounted transversely on the top of the dropout (22) and has a closed end, an inner surface, a through hole (223), an open end (222) and an annular groove (224). The closed end of the mounting sheath (221) is attached to the top of the dropout (22). The through hole (223) is formed axially through the closed end of the mounting sheath (221). The open end (222) is communicated with the through hole (223). The annular groove (224) is formed in the inner surface of the mounting sheath (221) near the open end (222). The bearing (225) is mounted in the mounting sheath (221) from the open end (222). The C-ring (226) is mounted in the annular groove (224) to hold the bearing (225) inside the mounting sheath (221). The cover (227) is attached to the mounting sheath (221) to close the open end (222).

With reference to FIGS. 2 to 4, the upper fork (23) is connected to the dropouts (22) and the shock absorber (30) and has two bottom ends (231), a top end and two fasteners (24). The bottom ends (231) of the fork upper (23) are respectively connected to the closed ends of the mounting sheaths (221) of the dropouts (22) and each bottom end (231) has a mounting hole (232) and a mounting sleeve (233). The mounting hole (232) is formed through the bottom end (231) and is aligned with the through hole (223) in a corresponding mounting sheath (221). The mounting sleeve (233) is connected to the mounting hole (232), extends into the through hole (223) of the corresponding mounting sheath (221) and abuts with the bearing (225). The top end is connected to the shock absorber (30). The fasteners (24) are connected to the bottom ends (231) and the dropouts (22), and each fastener (24) has an inserting tube (241) and a bolt (242). The inserting tube (241) extends through the mounting hole (232) in the bottom end (231), the mounting sleeve (233) and the bearing (225) and has an inner thread (243). The bolt (242) extends through the cover (227), the C-ring (226) and the bearing (225) and is screwed into the inserting tube (241) to connect the mounting sheath (221) with the bottom end (231) of the upper fork (23) and has an outer thread (244). The outer thread (244) of the bolt (242) is screwed with the inner thread (243) of the inserting tube (241).

Figure 5:
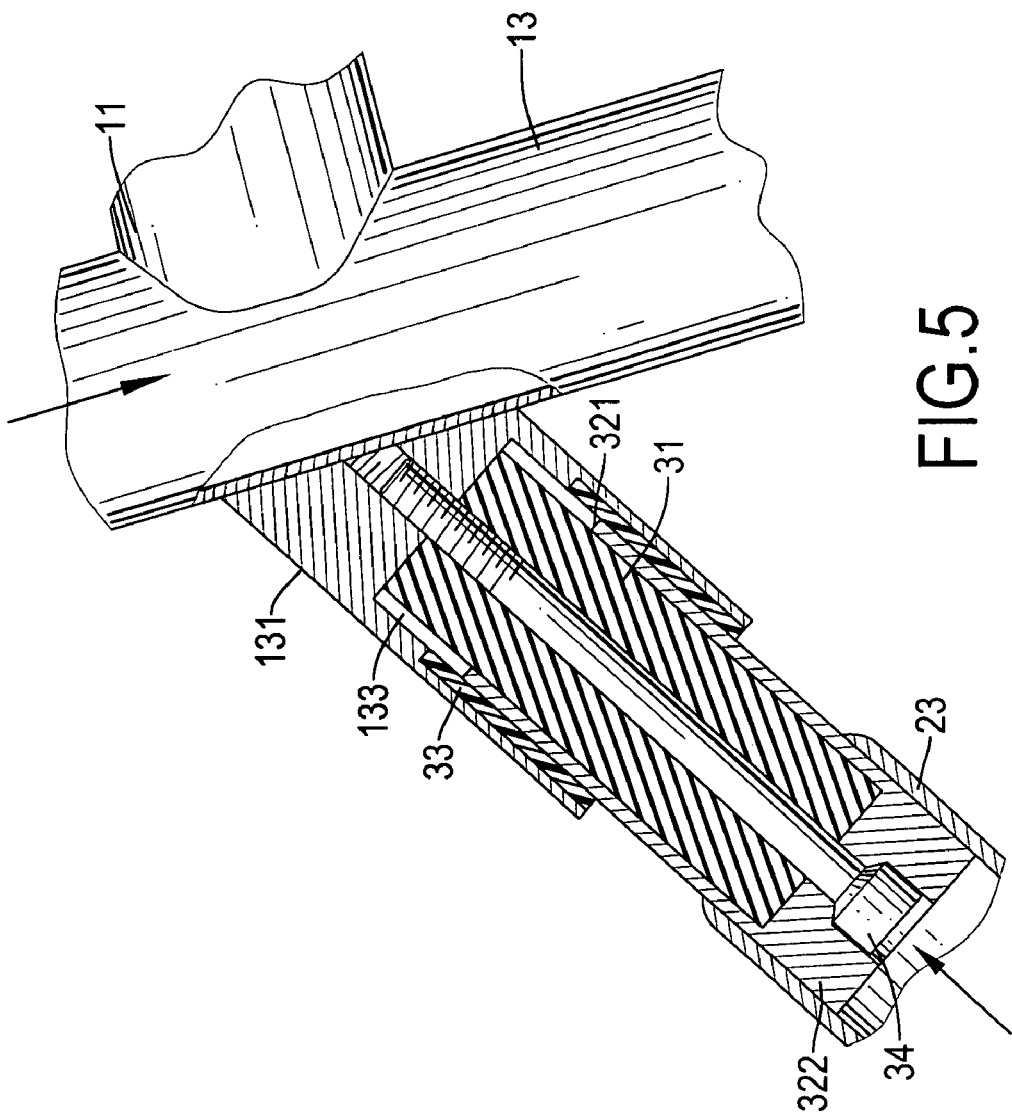
FIG. 5 is a side view in partial section of the bicycle frame in FIG. 4.

With further reference to FIGS. 4 and 5, the shock absorber (30) is mounted between the seat tube (13) of the front frame (10) and the upper fork (23) of the rear frame (20), absorbs shock applied to the rear frame (20) and has a sleeve (33), an elastomer (31), a connecting pipe (32) and a shaft (34). The sleeve (33) is tubular and is mounted in the chamber (133) of the jacket (131) through the opening (132). The elastomer (31) is extended into the chamber (133) of the jacket (131) and has a center and a central hole (311). The central hole (311) is formed axially through the center of the elastomer (31) and is communicated with the threaded hole (134). The connecting pipe (32) is mounted around the elastomer (31) and has an open end (321), a mounting end (322) and a connecting hole (323). The open end (321) of the connecting pipe (32) extends into the sleeve (33) and the chamber (133) in the jacket (131) and is mounted around the elastomer (31). The mounting end (322) is connected securely to the top end of the upper fork (23). The connecting hole (323) is formed through the mounting end (322) of the connecting pipe (32) and is aligned with the central hole (311) of the elastomer (31). The shaft (34) extends through the connecting hole (323) of the connecting pipe (32) and the central hole (311) of the elastomer (31) and is screwed into the threaded hole (134) in the seat tube (13). With the shaft (34), the connecting pipe (32), the sleeve (33) and the elastomer (31) are connected to the jacket (131) of the seat tube (13). With the shock absorber (30) mounted between the upper fork (23) and the jacket (131) of the seat tube (13), a shock applied to the rear frame (20) causes the rear frame (20) to move up and compress the shock absorber (30) to absorb the shock.

The bicycle frame as described has the following advantages.

1. The bicycle frame can provide a shock absorbing capability with the shock absorber (30) to absorb the shock transmitted from the rear frame (20).

2. The shock absorber (30) is mounted inside the jacket (131) of the seat tube (13) and the upper fork (23), and this may prevent the shock absorber (30) weaken and improve the appearance of the bicycle frame.

Figure 6:
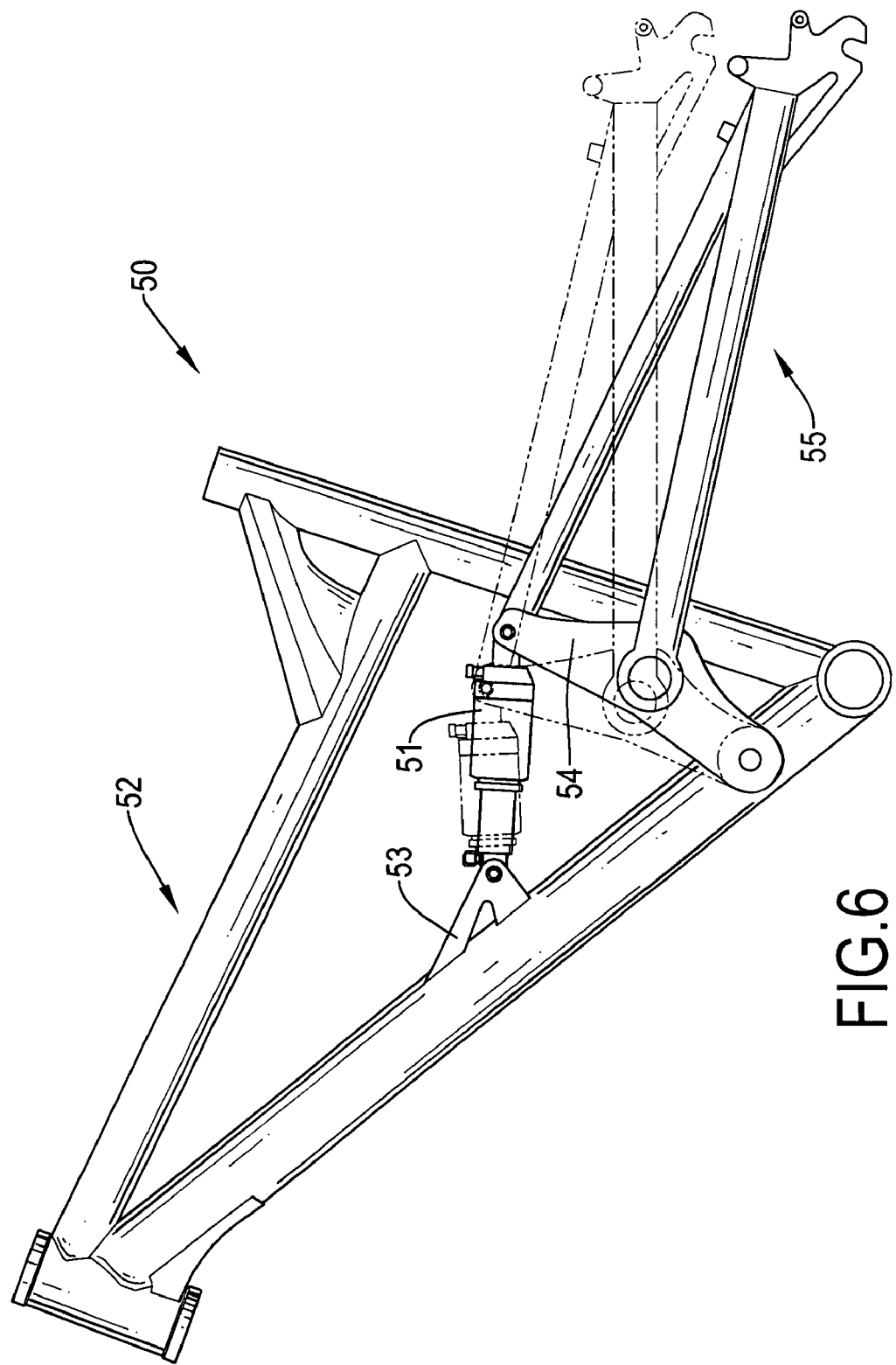
FIG. 6 is an operational side view of a conventional bicycle frame in accordance with the prior art.

3. The weights of the elastomer (31), the connecting pipe (32), the sleeve (33) and the shaft (34) are less than the weights the mounting bracket (53) and the driving bracket (54) on a conventional frame as shown in FIG. 6, and this can reduce the weight of and the cost for manufacturing the bicycle frame.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A frame for a bicycle having
   a front frame having
      a front;
      a rear;
      a head tube being formed at the front of the front frame;
      a down tube being connected to and protruded at an angle down from the head tube toward the rear end of the front frame and having a bottom end;
      a top tube being connected to and protruding from the head tube toward the rear end of the front frame and having a rear end;
      a bottom bracket shell being connected transversally to the bottom end of the down tube and having a top; and
      a seat tube being connected to and protruded up from the top of the bottom bracket shell, being connected to the rear end of the top tube and having
         an external surface;
         an upper end;
         a lower end;
         a jacket being formed on and protruded down from the external surface of the seat tube near the upper end opposite to the top tube and having
            a mounting end being formed on the external surface of the seat tube;
            a connecting end;
            an opening being defined in the connecting end of the seat tube opposite to the mounting end; and
            a chamber being defined in the jacket and being communicated with the opening; and
         a threaded hole being formed axially through the mounting end of the jacket and being communicated with the chamber;
   a rear frame being connected pivotally to the front frame and having
      a lower fork being connected pivotally to the bottom bracket shell below the seat tube and having
         a front end being connected to the bottom bracket shell; and two rear ends being formed with the front ends and parallel to each other;

two dropouts being respectively mounted to the rear ends of the lower fork; and an upper fork being connected to the dropouts; and a shock absorber being mounted between the seat tube of the front frame and the upper fork of the rear frame and having an elastomer being extended into the chamber of the jacket and having a center; and a central hole being formed axially through the center of the elastomer and being communicated with the threaded hole;

a connecting pipe being mounted around the elastomer and having an open end extending into a sleeve and the chamber in the jacket and being mounted around the elastomer;

a mounting end being connected securely to the upper fork; and a connecting hole being formed through the mounting end of the connecting pipe and being aligned with the central hole of the elastomer; and a shaft extending through the connecting hole of the connecting pipe and the central hole of the elastomer and being screwed into the threaded hole of the seat tube.

2. The bicycle frame as claimed in claim 1, wherein each dropout has a top;

a mounting sheath being hollow, being mounted transversely on the top of the dropout and having a closed end being attached to the top of the dropout;

an inner surface;

a through hole being formed axially through the closed end of the mounting sheath;

an open end being communicated with the through hole; and an annular groove being formed in the inner surface of the mounting sheath near the open end;

a bearing being mounted in the mounting sheath;

a C-ring being mounted in the annular groove to hold the bearing inside the mounting sheath; and a cover being attached to the mounting sheath to close the open end.

3. The bicycle frame as claimed in claim 2, wherein the upper fork has two bottom ends being respectively connected to the closed ends of the mounting sheaths of the dropouts and each bottom end having a mounting hole being formed through the bottom end and being aligned with the through hole of a corresponding mounting sheath; and a mounting sleeve being connected to the mounting hole, extending into the through hole of the corresponding mounting sheath and abutting with the bearing;

a top end being connected to the shock absorber; and two fasteners being connected to the bottom ends and the dropouts.

4. The bicycle frame as claimed in claim 3, wherein each fastener has an inserting tube extending through the mounting hole in the bottom end, the mounting sleeve and the through hole of the mounting sheath and having an inner thread; and a screwed bolt extending through the cover, the C-ring and the bearing and being screwed into the inserting tube to connect the mounting sheath with the bottom end of the upper fork and having an outer thread screwed with the inner thread of the inserting tube.

5. The bicycle frame as claimed in claim 4, wherein the shock absorber has a sleeve being tubular, being mounted in the chamber of the jacket from the opening and the connecting pipe extends into the sleeve.

6. The bicycle frame as claimed in claim 1, wherein the shock absorber has a sleeve being tubular, being mounted in the chamber of the jacket from the opening and the connecting pipe extends into the sleeve.

* * * * *